United States Patent
Yonesato et al.

(10) Patent No.: US 8,741,502 B2
(45) Date of Patent: Jun. 3, 2014

(54) NICKEL OXIDE POWDER MATERIAL FOR SOLID OXIDE TYPE FUEL CELL AND METHOD FOR PRODUCING THE SAME, AND ANODE MATERIAL, ANODE AND SOLID OXIDE TYPE FUEL CELL USING THE SAME

(71) Applicant: Sumitomo Metal Mining Co., Ltd., Tokyo (JP)

(72) Inventors: Norimichi Yonesato, Niihama (JP); Yasumasa Hattori, Niihama (JP); Hideyuki Yamashita, Niihama (JP); Tai Itou, Niihama (JP)

(73) Assignee: Sumitomo Metal Mining Co., Ltd., Tokyo (JP)

( * ) Notice: Subject to any disclaimer, the term of this patent is extended or adjusted under 35 U.S.C. 154(b) by 0 days.

(21) Appl. No.: 13/954,467

(22) Filed: Jul. 30, 2013

(65) Prior Publication Data

US 2013/0309399 A1 Nov. 21, 2013

Related U.S. Application Data

(62) Division of application No. 12/734,217, filed as application No. PCT/JP2008/069510 on Oct. 28, 2008.

(30) Foreign Application Priority Data

Nov. 5, 2007 (JP) ................................. 2007-286860

(51) Int. Cl.
| | |
|---|---|
| H01M 8/10 | (2006.01) |
| H01M 4/48 | (2010.01) |
| H01M 4/88 | (2006.01) |
| C01G 53/04 | (2006.01) |
| C01B 13/18 | (2006.01) |
| C01G 25/02 | (2006.01) |

(52) U.S. Cl.
USPC ........ 429/488; 423/138; 423/592.1; 423/608; 252/182.1

(58) Field of Classification Search
USPC ............... 429/488, 482, 478, 425; 252/182.1; 423/138, 592.1, 608
See application file for complete search history.

(56) References Cited

U.S. PATENT DOCUMENTS

| | | | |
|---|---|---|---|
| 2,166,984 | A | 7/1939 | Burgers et al. |
| 5,063,122 | A | 11/1991 | Rohr |

(Continued)

FOREIGN PATENT DOCUMENTS

| | | |
|---|---|---|
| JP | 08-055625 A | 2/1996 |
| JP | 2001-517859 | 10/2001 |
| JP | 2004-327278 A | 11/2004 |
| JP | 2005-339905 A | 12/2005 |

(Continued)

OTHER PUBLICATIONS

"Preparation of NiO/YSZ Powders Using a Pechini-Type Method", Razpotnik et al., Materiali in Tehnologije (40), 2006 (2), p. 69-72.*

(Continued)

*Primary Examiner* — Kenneth Douyette
(74) *Attorney, Agent, or Firm* — Edwards Wildman Palmer LLP

(57) ABSTRACT

A nickel oxide powder material that can restrain cracking of electrode due to oxidation expansion and peeling from a electrolyte and thus can decrease deterioration of the power generation characteristics, when used as an anode material for a solid oxide type fuel cell and its efficient production method, and the anode material for the solid oxide type fuel cell using the nickel oxide powder material. The nickel oxide powder material for an anode material constituting a solid oxide type fuel cell is characterized in that it is made up of a core particle (a) composed of a nickel oxide fine particle and a coating layer (b) including a zirconium hydroxide, which is formed on the surface of the core particle (a), as its main component, and that the zirconium content contained in the coating layer (b) is 0.001 to 0.01 g/m² per surface area of the nickel oxide fine particle.

7 Claims, 1 Drawing Sheet

(56) References Cited

U.S. PATENT DOCUMENTS

| | | |
|---|---|---|
| 2003/0096155 A1 | 5/2003 | Hong et al. |
| 2003/0235745 A1 | 12/2003 | Mook et al. |
| 2005/0019637 A1 | 1/2005 | Herman et al. |
| 2005/0048356 A1 | 3/2005 | Ihringer et al. |
| 2005/0129995 A1 | 6/2005 | Kato et al. |

FOREIGN PATENT DOCUMENTS

| | | |
|---|---|---|
| JP | 2006/286607 A | 10/2006 |
| WO | WO-2006/101136 A1 | 9/2006 |
| WO | WO-2007/020863 A1 | 2/2007 |

OTHER PUBLICATIONS

David Waldbillig et al., "Thermal analysis of the cyclic reduction and oxidation behaviour of SOFC anodes," Solid State Ionics, No. 176, 2005, pp. 847-859.

International Search Report dated Dec. 9, 2008, issued on PCT/JP2008/069510.

J. W. Moon et al., "Preparation of $ZrO_2$-coated NiO powder using surface-induced coating," Materials Letters, vol. 38, No. 3, Feb. 1999, pp. 214-220.

F. H. Wang et al., "Preparation and properties of Ni/YSZ anode by coating precipitation method," Materials Letters vol. 58, No. 24, Sep. 2004, pp. 3079-3083.

Supplementary European Search Report dated Oct. 2, 2012, issued for corresponding European Patent Application No. 08846733.7.

"Internal reforming over nickel/zirconia anodes in SOFCS oparating on methane: influence of anode formulation, pre-treatment and operating conditions", Finnerty et al., Journal of Power Sources, vol. 86, Issues 1-2, Mar. 2000, pp. 390-394.

"Development and testing of anode-supported solid oxide fuel cells with slurry-coated electrolyte and cathode", R. Muccillo et al., Journal of Power Sources 156 (2006) 455-460, Aug. 18, 2005.

* cited by examiner

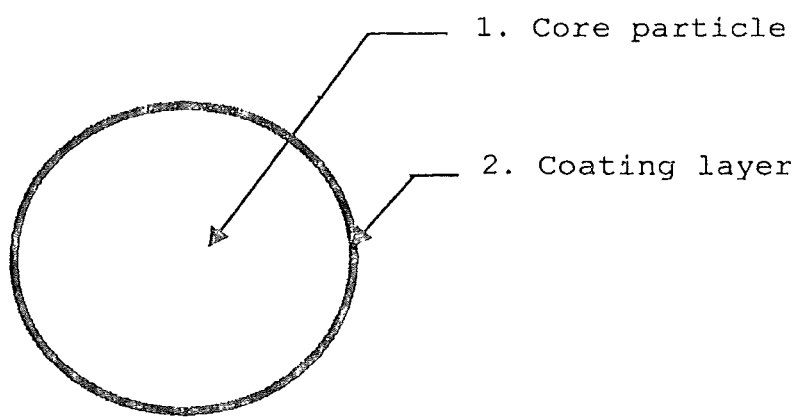

NICKEL OXIDE POWDER MATERIAL FOR SOLID OXIDE TYPE FUEL CELL AND METHOD FOR PRODUCING THE SAME, AND ANODE MATERIAL, ANODE AND SOLID OXIDE TYPE FUEL CELL USING THE SAME

This application is a divisional application of U.S. application Ser. No. 12/734,217, filed Apr. 19, 2010 which claims benefits of Japanese Patent Application 2007-286860 filed Nov. 5, 2007.

BACKGROUND OF THE INVENTION

1. Field of the Invention

The present invention relates to a nickel oxide powder material for a solid oxide type fuel cell (SOFC) and production method thereof, and an anode material using it, and in more detail, relates to a nickel oxide powder material that can restrain cracking of electrode due to oxidation expansion and peeling from a electrolyte and thus can decrease deterioration of the power generation characteristics, even in the case that the anode is exposed to an oxidizing atmosphere, for example, caused by the disruption of the fuel supply at operating temperature, or the like when used as an anode material for a solid oxide type fuel cell and its efficient production method, and the anode material for the solid oxide type fuel cell using the nickel oxide powder material.

2. Description of the Prior Art

In recent years, a solid oxide type fuel cell has been expected as a new power generation system from the both standpoints of environment and energy.

Generally, a solid oxide type fuel cell is sometimes called a solid electrolyte type fuel cell and has a structure in which a cathode, a solid electrolyte and an anode are laminated in order. Usually, a solid electrolyte composed of, for example, nickel or nickel oxide and stabilized zirconia is used as an anode. In addition, porous $LaMnO_3$ or the like is used as a cathode, and stabilized zirconia or the like is used as a solid electrolyte. It should be noted that, in such a solid oxide type fuel cell, oxygen taken in from the cathode side in the form of oxide ion, and hydrogen taken in from the anode side. Oxide ion through a solid electrolyte and hydrogen react electrochemically via solid electrolyte to generate electromotive force.

As a production method of the above solid oxide type fuel cell, in the case of a plate type, there is employed a method wherein firstly a cell-supporting member, which is generally an electrolyte or an anode, is prepared by tape molding or extrusion molding, and then tape molded product of other component member is laminated thereon, or a slurry is adhered on the cell-supporting member by coating, and then is sintered. Generally in this method, at least two of each component member such as the anode, the electrolyte and the cathode are sintered at the same time in order to simplify the production process and reduce the production cost. In the case of a tube type, a solid oxide type fuel cell is produced by applying each slurry of the materials constituting the electrode and the electrolyte to the tube supporting member followed by sintering.

Incidentally, an anode of a solid oxide type fuel cell is exposed to a reducing atmosphere by hydrogen and hydrocarbons during power generation, and the nickel oxide is reduced to metal nickel. Here, when the anode is exposed to an oxidizing atmosphere caused by the disruption of the fuel supply at operating temperature or an air leak caused by cell damage, the metal nickel is oxidized, and there has been a problem that the cracking of electrode due to oxidation expansion and peeling from a electrolyte happened and thus the characteristics such as power generation performance are deteriorated.

As a solution to the above-described problem, nickel oxide powder containing chromium oxide or manganese oxide is disclosed (for example, see Patent literature 1). Although, in these materials, an effect for restraining the shrinkage of an anode is confirmed, they do not seem to have a sufficient effect for restraining cracking, peeling and warping when the anode is exposed to an oxidizing atmosphere caused by the disruption of the fuel supply at operating temperature or the like.

It is also proposed that nickel or nickel oxide is coated with a small amount of an electrolyte by impregnating the porous base in a metal salt solution, drying and then sintering, after preparing a porous base by sintering once, in order to restrain cracking, peeling and warping when it is exposed to an oxidizing atmosphere caused by the disruption of the fuel supply at operating temperature or the like (for example, see Patent literature 2). This preparation method, however, is complicated and is not industrially effective.

Further, it is also reported that, when used as an anode material for a solid oxide type fuel cell, adjustment to a coarse microstructure of electrode has an effect for restraining cracking, peeling and warping when an anode is exposed to an oxidizing atmosphere caused by the disruption of the fuel supply at operating temperature or the like (for example, see Non-patent literature 1), however, the coarse micro structure is not preferable because it sacrifices a reaction interface (three phase boundary: TBP) and causes deterioration of the power generation characteristics.

Under the above situations, a nickel oxide powder material has been desired that can restrain cracking of anode due to oxidation expansion and peeling from a solid electrolyte and thus can decrease deterioration of the power generation characteristics in the case that the anode is exposed to an oxidizing atmosphere caused by the disruption of the fuel supply at operating temperature or the like without impairing the performance as a final fuel cell system when used as an anode material in producing a solid oxide type fuel cell.

Patent literature 1: WO/2007/020863 (page 1, Page 2)
Patent literature 2: JP-A-8-55625 (page 1, Page 2)
Non-patent literature: "solid state ionics", (Holland), 2005, No. 176, p. 847-859

SUMMARY OF THE INVENTION

Considering the above problems in conventional technologies, an object of the present invention is to provide a nickel oxide powder material that can restrain cracking of anode due to oxidation expansion and peeling from a solid electrolyte and thus can decrease deterioration of the power generation characteristics even in the case that the anode is exposed to an oxidizing atmosphere caused by the disruption of the fuel supply at operating temperature or the like when used as an anode material for a solid oxide type fuel cell and its efficient production method, and an anode material for a solid oxide type fuel cell using the nickel oxide powder material.

The present inventors have intensively studied a nickel oxide powder to be used for an anode constituting a solid oxide type fuel cell in order to attain the above object, and as a result, have found that when a nickel oxide powder material, in which a coating layer containing a specific amount zirconium was formed on the surface of a nickel oxide fine particle by a specific amount, is used as the anode material, it can restrain cracking of anode due to oxidation expansion and peeling from a solid electrolyte and thus can decrease deterioration of the power generation characteristics in the case that the anode is exposed to an oxidizing atmosphere caused by the disruption of the fuel supply at operating temperature or the like, and completed the present invention.

That is, according to the first aspect of the present invention, there is provided a nickel oxide powder material to be used for an anode material constituting a solid oxide type fuel cell, characterized in that it includes a core particle (a) composed of a nickel oxide fine particle and a coating layer (b) including a zirconium hydroxide, which is formed on the surface of the core particle (a), as its main component and that the zirconium content to be contained in the coating layer (b) is 0.001 to 0.01 g/m$^2$ per surface area of the nickel oxide fine particle.

In addition, according to the second aspect of the present invention, there is provided the nickel oxide powder material characterized in that the layer thickness of the coating layer (b) is 0.5 to 5 nm, in the first aspect.

In addition, according to the third aspect of the present invention, there is provided the nickel oxide powder material characterized in that the particle diameter of the core particle (a) is 0.1 to 5 μm in the median diameter D50, in the first or second aspect.

In addition, according to the fourth aspect of the present invention, there is provided the nickel oxide powder material characterized in that the coating layer (b) contains a zirconium oxide instead of a zirconium hydroxide as its main component, in the nickel oxide powder material of any one of first to third aspects.

In addition, according to the fifth aspect of the present invention, there is provided a production method of the nickel oxide powder material of any one of first to third aspects characterized by including a step (A) for supplying an aqueous solution including a zirconium salt and urea into an aqueous suspension including a nickel oxide fine particle to form the nickel oxide fine particle having a coating layer including a zirconium hydroxide as its main component, and a step (B) for subjecting the nickel oxide fine particle formed in the step (A) to solid/liquid separation and drying treatment.

In addition, according to the sixth aspect of the present invention, there is provided a production method of the nickel oxide powder material of the fourth aspect characterized by including a step (A) to form the nickel oxide fine particle having a coating layer including a zirconium hydroxide as its main component by supplying an aqueous solution including a zirconium salt and urea into an aqueous suspension including a nickel oxide fine particle, a step (B) for subjecting the nickel oxide fine particle formed in the step (A) to solid/liquid separation and drying treatment, and a step (C) for subjecting the nickel oxide fine particle after drying treatment obtained in the step (B) to heating treatment and subjecting the zirconium hydroxide to thermal decomposition.

In addition, according to the seventh aspect of the present invention, there is provided the production method of a nickel oxide powder material characterized in that the aqueous solution including the zirconium salt and urea includes a sufficient amount of the zirconium salt to satisfy that the zirconium content contained in the coating layer (b) of the obtained nickel oxide powder material is 0.001 to 0.01 g/m$^2$ per surface area of the nickel oxide fine particle to be used for the core particle (a), in the fifth or sixth aspect.

In addition, according to the eighth aspect of the present invention, there is provided the production method of a nickel oxide powder material characterized in that the zirconium salt is zirconium sulfate or zirconyl nitrate, in any one of the fifth to seventh aspects.

In addition, according to the ninth aspect of the present invention, there is provided the production method of a nickel oxide powder material characterized in that sodium hexametaphosphate is added into the aqueous suspension, in any one of the fifth to eighth aspects.

In addition, according to the tenth aspect of the present invention, there is provided an anode material for a solid oxide type fuel cell characterized in that it includes the nickel oxide powder material of any one of first to forth aspects and a solid electrolyte and that the blending ratio of the solid electrolyte to the total amount of the nickel oxide powder material and the solid electrolyte is 30 to 50% by mass.

In addition, according to the eleventh aspect of the present invention, there is provided the anode material for a solid oxide type fuel cell characterized in that a sintered pellet obtained by subjecting a pellet molded under a pressure of 98 MPa to heating treatment at 1,400° C. has an oxidation expansion coefficient in the vertical direction of 4% or lower in TMA measurement under the condition that the sintered pellet is kept in a reducing atmosphere and then oxidized again by blowing an air at 900° C., in the tenth aspect.

In addition, according to the twelfth aspect of the present invention, there is provided the anode material for a solid oxide type fuel cell characterized in that a voltage drop rate after 3 (three) cycles in the oxidation-re-reduction cycle of an anode formed on a solid electrolyte is lower than 5% to the voltage of the anode before oxidation at a current density of 0.5 A/cm$^2$ or lower, in the tenth aspect.

In addition, according to the thirteenth aspect of the present invention, there is provided the anode material for a solid oxide type fuel cell characterized in that a voltage drop rate after 1 (one) cycles of the oxidation-re-reduction cycle of an anode formed on a solid electrolyte is lower than 0.50 to the voltage of the anode before oxidation at a current density of 0.5 A/cm$^2$ or lower, in the tenth aspect.

In addition, according to the fourteenth aspect of the present invention, there is provided an anode for a solid oxide type fuel cell characterized by being obtained by sintering the anode material for a solid oxide type fuel cell of any one of the tenth to thirteenth aspects.

In addition, according to the fifteenth aspect of the present invention, there is provided a solid oxide type fuel cell characterized by being equipped with the anode for a solid oxide type fuel cell of the fourteenth aspect.

The nickel oxide powder material of the present invention is extremely valuable in industries because it can restrain cracking of anode due to oxidation expansion and peeling from solid electrolyte and thus can decrease deterioration of power generation performance in the case that the anode is exposed to an oxidizing atmosphere caused by the disruption of the fuel supply at operating temperature or the like when used as an anode material for a solid oxide type fuel cell. In addition, the production method of a nickel oxide powder material of the present invention is a useful method because it can efficiently produce the above nickel oxide powder material. In addition, the anode material and the anode of the present invention are especially preferable as an anode material and an anode for a solid oxide type fuel cell.

BRIEF DESCRIPTION OF THE DRAWING

FIG. 1 is a schematic drawing showing the structure of the nickel oxide powder material of the present invention.

NOTATION

1 Core Particle
2 Coating layer

DETAILED DESCRIPTION OF THE INVENTION

Hereinafter, the nickel oxide powder material for a solid oxide type fuel cell of the present invention and its production method, and the anode material, anode and solid oxide type fuel cell using it, will be described in detail.

1. Nickel Oxide Powder Material

The nickel oxide powder material of the present invention is a nickel oxide powder material to be used for an anode material constituting a solid oxide type fuel cell and is characterized in that it includes a core particle (a) composed of a nickel oxide fine particle and a coating layer (b) including a zirconium hydroxide, which is formed on the surface of the core particle (a), as its main component and that the zirconium content to be contained in the coating layer (b) is 0.001 to 0.01 g/m$^2$ per surface area of the nickel oxide fine particle. Further, as needed, the coating layer (b) can contain a zirconium oxide instead of a zirconium hydroxide as its main component.

As shown in FIG. 1, it is important that the nickel oxide powder material of the present invention is composed of a core particle 1 composed of a nickel oxide fine particle, and a coating layer 2 including a zirconium hydroxide, which is formed on the surface of the core particle, or a zirconium oxide, as its main component. As a result, it is attained that the nickel oxide powder material of the present invention used as an anode material can greatly restrain oxidation expansion and thus can decrease deterioration of power generation performance compared with conventional nickel oxide powder not having the above coating layer (b), in the case that the anode is exposed to an oxidizing atmosphere caused by the disruption of the fuel supply at operating temperature or the like.

That is, in the solid oxide type fuel cell using nickel oxide powder as the anode material, a nickel oxide fine particle is reduced to a metal nickel fine particle at power generation resulting in decrease of the particle volume and formation of pores. At this time, in the case that the coating layer (b) is not formed on the surface of the nickel oxide fine particle and therefore sintering of the metal nickel fine particle is not restrained, the pores near the nickel fine particle disappear in sintering. However, in the case of the nickel oxide powder material forming the coating layer (b) formed on the surface of its nickel oxide fine particle, the pores do not disappear by sintering and are present near the nickel fine particle during power generation. In the state that such pores are present, the pores favorably absorb the expansion due to oxidation of nickel and can remarkably decrease the oxidation expansion of the electrode even when the electrode is oxidized due to the disruption of the fuel supply at operating temperature or the like.

Further, the oxide layer obtained from the coating layer (b) has a function of suppressing sintering and thus can improve long-term durability. By these reasons, the solid oxide type fuel cell using the nickel oxide powder of the present invention as its anode material can favorably maintain the microstructure of the electrode and can decrease the electrode reaction resistance leading to improved cell output and thus can decrease deterioration of power generation performance even when the anode is exposed to an oxidizing atmosphere.

The coating layer (b) constituting the nickel oxide powder material of the present invention is a coating layer including a zirconium hydroxide or a zirconium oxide as its main component. By the way, if the above coating layer includes a zirconium hydroxide, the zirconium hydroxide is converted to a zirconium oxide when the nickel oxide powder material is sintered to form an electrode. Therefore, after sintering once, a fired nickel oxide fine particle coated with an oxide layer including zirconium as its main product is obtained. Therefore, one, in which the hydroxide in the coating layer (b) is converted to the oxide by heating the nickel oxide powder of the present invention in advance, can be used for firing as electrode material. Furthermore, when the hydroxide is converted to the oxide, steam is discharged, therefore, influence such as cracks due to steam during sintering may be apprehended. For this reason, it is advantageous to convert the hydroxide in the coating layer (b) to the oxide by heating in advance.

In the above nickel oxide fine particle, the content of zirconium contained in the coating layer (b) is specified as a weight (unit: g) per the unit surface area (unit: m$^2$) of a nickel oxide fine particle used as the core particle (a). Incidentally, the surface area of the nickel oxide fine particle is determined by the specific surface area measured by the BET method. Here, the content of zirconium contained in the coating layer (b) is 0.001 to 0.01 g/m$^2$, preferably 0.005 to 0.01 g/m$^2$ per surface area of the nickel oxide fine particle used as the core particle (a). That is, when the content of zirconium contained in the coating layer (b) is lower than 0.001 g/m$^2$, the coating amount is too small to coat the nickel oxide fine particle sufficiently and to give a restrain effect of oxidation expansion in the case of exposure to an oxidizing atmosphere, when used as anode. On the other hand, when the content of zirconium contained in the coating layer (b) is higher than 0.01 g/m$^2$, the coating amount is too large, resulting in increase of electric resistance of the anode and reduction of power generation efficiency, when used as anode.

The thickness of the above coating layer (b) is not especially limited, and preferably is, for example, 0.5 to 5 nm, although it depends on the particle diameter and specific surface area etc. of a nickel oxide fine particle used as the core particle (a). That is, thickness less than 0.5 nm does not always give a restrain effect of oxidation expansion in the case of exposure to an oxidizing atmosphere, when used as anode. On the other hand, thickness more than 5 nm sometimes increases electric resistance of anode and reduces power generation efficiency, when used as anode.

The particle diameter of a nickel oxide fine particle used as the above core particle (a) is not especially limited; and preferably is 0.1 to 5 µm in the median diameter D50. That is, a particle with a diameter larger than 5 µm is not preferable because it gives an electrode of less reaction interface (three phase boundary: TBP) and may have an adverse effect on the power generation characteristics. On the other hand, a particle with a diameter smaller than 0.1 µm increases electric resistance in the electrode and disturbs diffusion of fuel gas or steam generated in power generation and thus may have an adverse effect on the power generation characteristics. In addition, the particle diameter is limited in producing the nickel oxide powder material.

The composition of the coating layer (b) is not especially limited, and includes a composition forming a layer composed of zirconia stabilized with yttria, ceria, scandia or the like in addition to a composition forming zirconia sole layer after firing. Oxide-ion conductivity and long-term durability is improved by this.

2. Production Method for Nickel Oxide Powder Material

The production method of the nickel oxide powder material of the present invention is not especially limited, and is characterized by including, for example, a step (A) for supplying an aqueous solution including a zirconium salt and urea into an aqueous suspension including a nickel oxide fine particle to form the nickel oxide fine particle having a coating layer including a zirconium hydroxide as its main component, and a step (B) for subjecting the nickel oxide fine particle formed in the step (A) to solid/liquid separation and drying treatment. The nickel oxide powder material, which is consisted of a core particle (a) composed of a nickel oxide fine particle of the nickel oxide powder material of the present invention and a coating layer (b) including a zirconium hydroxide formed on the surface of the core particle (a) as its main component, is obtained by this method and it is suitable for a solid oxide type fuel cell.

In addition, the other production method of the nickel oxide powder material of the present invention is not especially limited, and is characterized by including, for example, following the step (A) and step (B) of the above production method, a step (C) for subjecting the drying-treated nickel oxide fine particle obtained in the step (B) to heating treatment and then to thermal decomposition of the zirconium hydroxide. The nickel oxide powder material, which is consisted of a core particle (a) composed of a nickel oxide fine particle of the nickel oxide powder material of the present invention and a coating layer (b) including a zirconium oxide formed on the surface of the core particle (a) as its main component, is obtained by this method and it is suitable for a solid oxide type fuel cell.

The step (A) of the above production method is a step for supplying an aqueous solution (hereinafter, may be referred to as coating solution) containing a zirconium salt and urea into an aqueous suspension including a nickel oxide fine particle to form the nickel oxide fine particle having a coating layer including a zirconium hydroxide as its main component.

Here, the zirconium salt becomes a hydroxide, which is used as a coating agent, while the urea functions as a base or has an effect of preventing sodium derived from a dispersant into the coating layer. It is necessary that the feed rate of coating solution is a rate to supply a sufficient amount of a zirconium salt for satisfying that the zirconium content contained in the coating layer (b) of the obtained nickel oxide powder material is 0.001 to 0.01 g/m$^2$ per surface area of the nickel oxide fine particle that is the core particle (a).

In addition, the urea content in the coating solution is not especially limited, and it is preferable to be molar equivalent or higher relative to zirconium.

The composition of the coating solution is not especially limited, and preferably the concentrations of a zirconium salt and urea in the coating solution are, for example, 0.007 to 0.14 mol/L and 0.09 to 18 g/L respectively.

The zirconium salt to be used in the coating solution is not especially limited, and preferably it is zirconium sulfate or zirconyl nitrate, which is inexpensive and easily obtained, and more preferably zirconium sulfate.

In addition, when forming a coating layer composed of zirconia stabilized with yttria, ceria, scandia or the like, a salt such as yttrium, cerium, scandium is existed together into a coating solution including a zirconium salt. By this method, an oxide layer after sintering can be changed to the zirconium oxide layer stabilized with yttria, ceria, scandia or the like.

In the step (A), the coating layer is formed by the following reactions. For example, when zirconium sulfate is used as the zirconium salt, the reaction is estimated to proceed according to following reaction formulae (1) and (2).

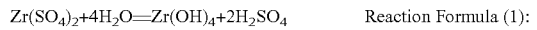
$$Zr(SO_4)_2 + 4H_2O \rightleftharpoons Zr(OH)_4 + 2H_2SO_4 \quad \text{Reaction Formula (1):}$$

$$NiO + H_2SO_4 \rightarrow NiSO_4 + H_2O \quad \text{Reaction Formula (2):}$$

Here, in reaction formula (2), NiO reacts with $H_2SO_4$ produced by the reaction of reaction formula (1) to produce $NiSO_4$, and reaction of reaction formula (2) proceeds from the left to the right.

As a result, $H_2SO_4$ is consumed and, therefore, according to the Le Chatelier's principle of equilibrium in reaction formula (1), it is considered that the formation reaction of zirconium hydroxide proceeds. Incidentally, when zirconyl nitrate is used in this reaction, $HNO_3$ is formed by the reaction.

In addition, as shown by reaction formula (1), the hydroxyl group to form the zirconium hydroxide is supplied from water. On this occasion, the weight ratio of a nickel oxide fine particle to water is not especially limited, but a sufficient amount of water to supply the hydroxyl group is necessary.

In the above reaction, a spontaneous nucleation is prevented by supplying the coating solution at a low rate and thus a coating layer can be formed on a core particle efficiently. Consequently, when the rate of coating is controlled so as to be mild by adjusting the feed rate of the coating solution into the aqueous suspension, linking by coating layers at the contact part of each core particle proceeds mildly as well. At this time, sufficient dispersion of the core particle and sufficient agitation of the suspension destroy the linking and a coated particle having a similar level of particle-size distribution to that of the core particle can be obtained.

For example, the feed rate of the coating solution is preferably 1 to 20 μmol/(m$^2$·min), more preferably 1 to 6 μmol/(m$^2$·min) per surface area of the core particle in zirconium content. In other words, a feed rate lower than 1 μmol/(m$^2$·min) gives too low productivity, while a feed rate higher than 20 μmol/(m$^2$·min) sometimes makes the link of each core particle strong leading to aggregation of the core particle.

The nickel oxide fine particle to be used as the core particle (a) in the step (A) is not especially limited, and any shape can be used as long as it is a nickel oxide particle obtained usually. Among them, a nickel oxide fine particle obtained by calcining nickel sulfate under an oxidizing atmosphere is preferable. In other words, the nickel oxide fine particle obtained by calcining nickel sulfate under an oxidizing atmosphere is very fine and highly crystalline and thus improves the efficiency of a fuel cell when used as an anode material.

The particle diameter of the above nickel oxide fine particle is not especially limited, and preferably is 0.1 to 5 μm, more preferably 0.3 to 1 μm in the median diameter D50, which is measured with a laser diffraction scattering type particle size analyzer (Microtrac 9320-X100, manufactured by Microtrac Inc.).

In other words, when the particle diameter is smaller than 0.1 μm, there is a risk that it is difficult to filter or handle in coating for forming a coating layer (b) and that linking becomes remarkable because of small inertia force by agitation. On the other hands, when the particle diameter is larger than 5 μm, there is a risk that it is difficult to coat uniformly due to sedimentation at coating.

In the step (A), in order to improve dispersibility of a particle in an aqueous suspension including a nickel oxide fine particle, it is preferable to add sodium hexametaphosphate, although it is not especially limited. This addition is also desirable from the standpoint of operation because adhesion of a zirconium hydroxide onto the inside wall of a reactor such as a beaker is reduced. Here, the amount of sodium hexametaphosphate to be added is preferably 0.001 to 0.2% by mass, more preferably 0.005 to 0.05% by mass, relative to water. In other words, when the amount of sodium hexametaphosphate to be added is less than 0.001% by mass, the effect of improving dispersibility of a particle is not sufficient, on the other hand, when the amount of sodium hexametaphosphate to be added is more than 0.2% by mass, the improvement effect more than addition amount is not expected and there is a risk that various hetero phases are formed by adsorption of phosphorus.

The step (B) of the above production method is a step for subjecting the nickel oxide fine particle formed in the step (A) to solid/liquid separation and drying treatment. Here, the method of solid/liquid separation is not especially limited, and a common method of filtration is used. In addition, the method of drying treatment is not especially limited, and a method of removing moisture may be used at 50 to 200° C., preferably 100 to 150° C., for example, under an oxidizing atmosphere such as an air atmosphere.

The step (C) of the above production method is a step for subjecting the nickel oxide fine particle after drying treatment obtained in the step (B) to heating treatment and thermal decomposition of a zirconium hydroxide. By this step, a nickel oxide powder material having a coating layer including a zirconium oxide as its main component is obtained. Incidentally, in particular, when there is a risk of cracking or the like during sintering caused by steam generated in conversion of the hydroxide to the oxide, it is preferable to carry out heating treatment in advance by the step (C) prior to sintering. This treatment has an effect of strengthening adhesion of the coating layer and preventing the coating layer from peeling in the production step of the anode.

The condition of the heating treatment in the above step (C) is not especially limited, and it is preferable to fire at a temperature 1,000° C. or lower, especially 700 to 1,000° C. under an oxidizing atmosphere such as an air atmosphere. In other words, the temperature is preferably 1,000° C. or lower to prevent excessive sintering of NiO or zirconium.

By the above production method, the nickel oxide powder material to be used for an anode material constituting a solid oxide type fuel cell is obtained at a low cost, which is consisted of a core particle (a) composed of a nickel oxide fine particle, and a coating layer (b) a zirconium hydroxide or zirconium oxide composed of a film having uniform layer thickness formed on the surface of core particle (a) as its main component, wherein the zirconium content contained in the coating layer (b) is 0.001 to 0.01 g/m$^2$ per surface area of the nickel oxide fine particle.

3. Anode Material, Anode and Solid Oxide Type Fuel Cell

The anode material of the present invention for a solid oxide type fuel cell is characterized in that it includes the above nickel oxide powder material and a solid electrolyte and that the blending ratio of the solid electrolyte to the total amount of the nickel oxide powder material and the solid electrolyte is 30 to 50% by mass. In other words, the anode material is formed by blending a solid electrolyte into the above nickel oxide powder material.

For example, the anode material for a solid oxide type fuel cell is produced by kneading the above nickel oxide powder material, a solid electrolyte and other components. Here, the method of kneading is not especially limited, and may be a method such as a ballmill that can uniformly mix the components.

As the blending ratio of the above nickel oxide powder material and a solid electrolyte in the above anode material, the blending ratio of the solid electrolyte to the total amount of the nickel oxide powder material and the solid electrolyte is 30 to 50% by mass, preferably 30 to 40% by mass from the standpoints of consistency of the thermal expansion coefficients with other cell component members and balancing between the mechanical strength and the electric conductivity. In other words, the blending ratio lower than 30% by mass gives poor consistency of the thermal expansion coefficients with the electrolyte and the cathode and may cause cracking and peeling. On the other hand, the blending ratio higher than 50% by mass makes the nickel oxide content lower and cannot form a good electric conductive path in power generation, which is not favorable.

The above solid electrolyte is not especially limited, and an oxide ion conductor such as yttria-stabilized zirconia, scandia-stabilized zirconia and ceria doped with 10 to 35 mol % of samaria, gadolinia, yttria or the like is used. When the operation temperature is a high temperature of 700 to 1,000° C., yttria-stabilized zirconia or scandia-stabilized zirconia is more preferable.

The oxidation expansion coefficient of the above anode material is not especially limited, and an oxidation expansion coefficient in the vertical direction obtained under the condition kept in a reducing atmosphere and then oxidized again by blowing air at 900° C. is 14% or lower, preferably 4% or lower, in TMA measurement using the sintered pellet obtained by subjecting a pellet compression-molded under a pressure of 98 MPa to heating treatment at 1,400° C. In other words, restraint of an oxidation expansion coefficient enables restraint of cracking of an electrode and peeling from a solid electrolyte due to the disruption of the fuel supply at operating temperature or the like. Incidentally, the method of measuring the above oxidation expansion coefficient will be described in the examples.

The above anode material is not especially limited, however, it is preferable that a voltage drop rate after 3 (three) cycles in the oxidation-re-reduction cycle of an anode formed on a solid electrolyte is only lower than 5% to the voltage of the anode before oxidation at a current density of 0.5 A/cm$^2$ or lower, or a voltage drop rate after 1 (one) cycles is further only lower than 0.5% to the voltage of the anode before oxidation at a current density of 0.5 A/cm$^2$ or lower, thus shows extremely good resistance to the oxidation-re-reduction cyclability. Incidentally, the method of evaluating the voltage drop rate (may be referred to as power generation characteristics of a single cell) after the oxidation-re-reduction cycle will be described in the examples.

The anode of the present invention for a solid oxide type fuel cell is characterized by being formed by sintering the above anode material.

The production method for the above anode for a solid oxide type fuel cell is as follows. For example, after preparing a paste or slurry of the above anode material, for example, in the case of a plate type, a part to support the cell, generally an electrolyte or an anode is firstly manufactured by tape molding or extrusion molding. Then, the tape-molded body of other component members is laminated thereon or the slurry is coated and adhered, and thereafter is fired at the condition of 1,200 to 1,500° C. under an oxidizing atmosphere. Here, the anode suitable for a solid oxide type fuel cell is obtained by thus sintering.

The solid oxide type fuel cell of the present invention is characterized by being provided with the above anode.

As the production method of the above solid oxide type fuel cell, when the anode is manufactured by sintering, for example, according to the above production method of an anode, in order to reduce the production cost by simplifying the production process, a method of firing simultaneously at least two of each structural materials such as an anode, an electrolyte and a cathode can be adopted. In addition, in the case of tube type, it is produced by coating each slurry of the materials constituting the electrode and the electrolyte onto a tube supporting body and then firing it similarly.

Incidentally, the solid oxide type fuel cell provided with the above anode is very excellent because cracking of the anode due to oxidation expansion and peeling from a solid electrolyte is restrained and the deterioration of power generation performance is reduced even when the anode is exposed to an oxidizing atmosphere caused by the disruption of the fuel supply at operating temperature or the like.

EXAMPLES

Hereinafter, the present invention will be described more specifically with reference to the examples and comparative examples, however, the present invention is not limited thereto at all. Incidentally, measurement of the median diameter D50 and the specific surface area of a nickel oxide raw material used in the examples and comparative examples, analysis of zirconium in a nickel oxide powder material, preparation of a sample for measuring the specific resistance of an anode material and measurement of the specific resistance, preparation of a sample for measuring the oxidation expansion coefficient of an anode material and measurement of the oxidation expansion coefficient and evaluation of the power generation characteristics of a single cell are as follows.
(1) Measurement of the median diameter D50 of a nickel oxide raw material: A laser diffraction scattering type particle size analyzer (Microtrac 9320-X100, manufactured by Microtrac Inc.) was used.
(2) Measurement of the surface area of a nickel oxide raw material: The specific surface area was determined by the BET method with using a specific surface measuring instrument (NOVA 1000e, manufactured by Yuasa-Ionics Inc.). By this method, the surface area was calculated from amount of a nickel oxide raw material.
(3) Analysis of zirconium in a nickel oxide powder material: It was analyzed by the ICP atomic emission spectroscopic analysis method.
(4) Preparation of a sample for measuring the specific resistance of an anode material and measurement of the specific resistance: As the method of preparing a sample for measuring the specific resistance of an anode material, a nickel oxide powder material and yttria-stabilized zirconia were weighed so that the blending ratio of the solid electrolyte to the total amount of the nickel oxide powder material and the solid electrolyte was 35% by mass to obtain the electrode material. 5% by mass of ethyl cellulose to the total amount of the electrode material was added thereto, thereafter was mixed uniformly using a mortar. 5 g of mixed powder was dispensed and subjected to molding by uniaxial pressing under a pressure of 98 MPa to obtain a cylindrical pellet of 25 mm in diameter. The pressured-molded pellet was then heated at a temperature rising rate of 10° C./min under atmosphere and fired at 1,400° C. for 3 hours. Thereafter, a rectangular parallelopiped of about 3 mm*3 mm*25 mm was cut out from the fired material and reduced at 950° C. for 3 hours under an atmosphere of 4% hydrogen and 96% nitrogen to obtain a sample for measurement.

Here, the specific resistance was measured at room temperature under air atmosphere by connecting 4 (four) conducting wires to the obtained sample for measurement and using a potentio-galvanostat (Model SI-1287, manufactured by Advanced Measurement Technology inc. Solartron Analytical) in the direct-current 4 (four)-terminal method.
(5) Preparation of a sample for measuring the expansion by oxidation coefficient of an anode material and measurement of the expansion coefficient by oxidation: As the method of preparing a sample for measuring the oxidation expansion coefficient of an anode material, a nickel oxide powder material and yttria-stabilized zirconia were weighed so that the blending ratio of the solid electrolyte to the total amount of the nickel oxide powder material and the solid electrolyte was 35% by mass to obtain the electrode material. 5% by mass of ethyl cellulose to the total amount of the electrode material was added thereto, thereafter was mixed uniformly using a mortar.

About 1 g of this mixed powder was dispensed and subjected to molding by uniaxial pressing under a pressure of 98 MPa to obtain a cylindrical pellet of 5 mm in diameter. The pressured-molded pellet was then heated at a temperature rising rate of 10° C./min under atmosphere and fired at 1,400° C. for 3 hours. Then, the oxidation expansion coefficient of the obtained sintered pellet was measured using a TMA instrument (Model TMA-4000S, manufactured by Bruker AXS K.K.). Specifically, the pellet was reduced by heating up to 900° C. at a rate of 10° C./min while introducing a gas of 2% hydrogen and 98% nitrogen at a rate of 0.3 liter/min. Subsequently, the same sample was heated up to 900° C. while introducing nitrogen at a rate of 0.3 liter/min and kept at the temperature and then the pellet was oxidized while introducing air at a rate of 0.3 liter/min, and the oxidation expansion coefficient in the vertical direction at 900° C. was measured.
(6) Evaluation of the power generation characteristics (voltage drop rate of anode after oxidation-re-reduction cycle) of a single cell: As the method of producing a single cell for evaluating the power generation characteristics of an anode material, a nickel oxide powder material and yttria-stabilized zirconia (YSZ) were firstly weighed so that the blending ratio of the solid electrolyte to the total amount of the nickel oxide powder material and the solid electrolyte was 35% by mass to obtain the electrode material. Then, terpineol as a solvent and 5% by mass of ethyl cellulose as a thickener or a substance to contribute to the pore structure of the electrode was added to the total amount of the electrode material followed by kneading to obtain a paste. Subsequently, the above paste was coated on a sintered disk of 0.5 mm in thickness made of YSZ using a screen printer so that the electrode area is 2 cm$^2$, and heated at a rate of 10° C./min and sintered at 1,400° C. for 3 hours to obtain an anode for evaluation with about 20 to 30 µm in thickness. On the other hand, a cathode about 20 to 30 µm in thickness made of lanthanum strontium manganite (LSM) was prepared by a similar method to the production method of the anode except that it was fired at 1,300° C. for 3 hours. In addition, a platinum paste was applied to the periphery of a sintered disk made of YSZ to obtain a reference electrode and thus a single cell for evaluating power generation was obtained.

In the above single cell for evaluating power generation (a voltage drop after oxidation-re-reduction), the atmospheres of the anode side of single cell, the atmospheres of reference electrode and the atmospheres of cathode were adjusted to a 5%-humidified hydrogen atmosphere, a 1% oxygen-99% argon atmosphere and an air respectively with using a glass seal. The voltage between the anode and the reference electrode was measured at various current densities by the 3 (three)-terminal method to determine the voltage drop rate at each current density and thus the power generation characteristics at 900° C. were evaluated.

Subsequently, after oxidation-re-reduction of the anode, the power generation characteristics were evaluated by a similar way to the above, and the voltage drop rate from the start of oxidation-re-reduction of the anode was determined. Here, in oxidation-re-reduction, after the anode side was subjected to purging once with argon gas, the anode was completely oxidized by blowing air for one hour or more and was subjected to purging again with argon gas, then, the anode was re-reduced by introducing 5%-humidified hydrogen. This procedure was repeated 1 (one) to 3 (three) times as necessary.

Example 1

5 g of a nickel oxide (NiO) fine particle having a median diameter D50 of 0.3 μm and a specific surface area of 4.4 m$^2$/g and 0.2 g of sodium hexametaphosphate as a dispersant was added into 1 L of water using a beaker and stirred vigorously for good dispersion to obtain an aqueous suspension. 2.5 mL of a coating solution composed of an aqueous solution containing zirconium sulfate of 0.14 mol/L of concentration and urea of 18 g/L of concentration was added into this aqueous suspension and kept for an hour or more after adding and then subjected to filtration for recovery using a 0.1 μm cellulose membrane filter, and dried at 100° C. in an atmospheric drier and then ground weakly in a mortar to obtain a nickel oxide powder material coated with a zirconium hydroxide. Incidentally, the amount of the added coating solution corresponds to charging amount of 0.5 nm as the layer thickness of the coating layer (b).

Subsequently, using the obtained nickel oxide powder material, the zirconium content contained in the coating layer (b) per surface area of the nickel oxide fine particle, the specific resistance and the oxidation expansion coefficient of the anode were determined according to the above method of measurement. The results are shown in Table 1.

Example 2

A nickel oxide powder material coated with a zirconium hydroxide was obtained by the similar method to Example 1 except that the additive amount of the coating solution changed to 5 mL. Incidentally, the amount of the added coating solution corresponds to charging amount of 1 nm as layer thickness of the coating layer (b).

Subsequently, using the obtained nickel oxide powder material, the zirconium content contained in the coating layer (b) per surface area of the nickel oxide fine particle, the specific resistance and the oxidation expansion coefficient of the anode were determined according to the above method of measurement. The results are shown in Table 1.

Example 3

A nickel oxide powder material coated with a zirconium hydroxide was obtained by the similar method to Example 1 except that the additive amount of the coating solution changed to 10 mL. Incidentally, the amount of the added coating solution corresponds to charging amount of 2 nm as the layer thickness of the coating layer (b).

Subsequently, using the obtained nickel oxide powder material, the zirconium content contained in the coating layer (b) per surface area of the nickel oxide fine particle, the specific resistance and the oxidation expansion coefficient of the anode were determined according to the above method of measurement. The results are shown in Table 1.

Example 4

A nickel oxide powder material coated with a zirconium hydroxide was obtained by the similar method to Example 1 except that the additive amount of the coating solution changed to 15 mL. Incidentally, the amount of the added coating solution corresponds to charging amount of 3 nm as the layer thickness of the coating layer (b).

Subsequently, using the obtained nickel oxide powder material, the zirconium content contained in the coating layer (b) per surface area of the nickel oxide fine particle, the specific resistance and the oxidation expansion coefficient of the anode were determined according to the above method of measurement. The results are shown in Table 1.

In addition, using the obtained nickel oxide powder material, a single cell was prepared and evaluated according to the above method of evaluating the power generation characteristics of a single cell. The oxidation-re-reduction cycle was repeated 3 times and the results of evaluation for each time are shown in Table 2.

Example 5

A nickel oxide powder material coated with a zirconium hydroxide was obtained by the similar method to Example 1 except that the additive amount of the coating solution changed to 20 mL. Incidentally, the amount of the added coating solution corresponds to charging amount of 4 nm as the layer thickness of the coating layer (b).

Subsequently, using the obtained nickel oxide powder material, the zirconium content contained in the coating layer (b) per surface area of the nickel oxide fine particle, the specific resistance and the oxidation expansion coefficient of the anode were determined according to the above method of measurement. The results are shown in Table 1.

Comparative Example 1

A nickel oxide powder material coated with a zirconium hydroxide was obtained by the similar method to Example 1 except that the additive amount of the coating solution changed to 0.5 mL. Incidentally, the amount of the added coating solution corresponds to charging amount of 0.1 nm as the layer thickness of the coating layer (b).

Subsequently, using the obtained nickel oxide powder material, the zirconium content in the coating layer (b) per surface area of the nickel oxide fine particle, the specific resistance and the oxidation expansion coefficient of the anode were determined according to the above method of measurement. The results are shown in Table 1.

Comparative Example 2

A nickel oxide powder material coated with a zirconium hydroxide was prepared by the similar method to Example 1 except that the additive amount of the coating solution changed to 50 mL. Incidentally, the additive amount of the coating solution corresponds to charging amount of 10 nm as the layer thickness of the coating layer (b).

Subsequently, using the obtained nickel oxide powder material, the zirconium content contained in the coating layer (b) per surface area of the nickel oxide fine particle, the specific resistance and the oxidation expansion coefficient of the anode were determined according to the above method of measurement. The results are shown in Table 1. Incidentally, because the specific resistance was too large to be suitable for an anode material, the oxidation expansion coefficient was not measured.

Comparative Example 3

A nickel oxide powder material coated with a zirconium hydroxide was obtained by the similar method to Example 1 except that the above coating solution was not added.

Subsequently, using the obtained nickel oxide powder material, the zirconium content contained in the coating layer (b) per surface area of the nickel oxide fine particle, the specific resistance and the oxidation expansion coefficient were determined according to the above method of measurement. The results are shown in Table 1.

In addition, using the obtained nickel oxide powder material, a single cell was prepared and evaluated according to the above method of evaluating the power generation characteristics of a single cell. The oxidation-re-reduction cycle was conducted 1 (one) time and the results of evaluation are shown in Table 2.

TABLE 1

|  | zirconium content per surface area of nickel oxide (g/m$^2$) | thickness of coating layer from charging amount (nm) | specific resistance (μΩ · cm) | oxidation expansion rate (%) |
| --- | --- | --- | --- | --- |
| Exam. 1 | 0.001 | 0.5 | 54 | 14 |
| Exam. 2 | 0.003 | 1 | 55 | 11 |
| Exam. 3 | 0.006 | 2 | 56 | 3.1 |
| Exam. 4 | 0.008 | 3 | 57 | 1.1 |
| Exam. 5 | 0.01 | 5 | 60 | 2.4 |
| C. Exam. 1 | 0.0003 | 0.1 | 54 | 16 |
| C. Exam. 2 | 0.03 | 10 | 210 | — |
| C. Exam. 3 | 0 | 0 | 54 | 16 |

Exam.: Example
C. Exam.: Comparative Example

TABLE 2

| | | power generation characteristics of single cell (between anode and reference electrode) | | | | | |
| --- | --- | --- | --- | --- | --- | --- | --- |
| | | current density (A/cm$^2$) | | | | | |
| | | 0.1 | 0.2 | 0.3 | 0.35 | 0.4 | 0.5 |
| Exam. 4 | before oxidation (V) | 0.89 | 0.83 | 0.76 | 0.73 | 0.70 | 0.63 |
| | after 1 cycle of oxidation-reduction (V) | 0.89 | 0.83 | 0.76 | 0.73 | 0.70 | 0.63 |
| | voltage drop rate (%) | 0 | 0 | 0 | 0 | 0 | 0 |
| | before oxidation (V) | 0.89 | 0.83 | 0.76 | 0.73 | 0.70 | 0.63 |
| | after 2 cycles of oxidation-reduction (V) | 0.88 | 0.82 | 0.75 | 0.71 | 0.68 | 0.61 |
| | voltage drop rate (%) | 1.1 | 1.2 | 1.3 | 2.7 | 2.9 | 3.2 |
| | before oxidation (V) | 0.89 | 0.83 | 0.76 | 0.73 | 0.70 | 0.63 |
| | after 3 cycles of oxidation-reduction (V) | 0.88 | 0.81 | 0.74 | 0.71 | 0.67 | 0.61 |
| | voltage drop rate (%) | 1.1 | 2.4 | 2.6 | 2.7 | 4.3 | 3.2 |
| C. Exam. 3 | before oxidation (V) | 0.90 | 0.84 | 0.78 | 0.75 | 0.72 | 0.66 |
| | after 1 cycle of oxidation-reduction (V) | 0.89 | 0.82 | 0.75 | 0.72 | 0.68 | 0.63 |
| | voltage drop rate (%) | 1.1 | 2.4 | 3.8 | 4.0 | 5.6 | 4.5 |

Exam.: Example
C. Exam.: Comparative Example

As apparent from Table 1, it can be understood that because the nickel oxide powder materials obtained in Examples 1 to 5, which were conducted according to the production method of the present invention, satisfy the requirements that the obtained nickel oxide powder material is consisted of a core particle composed of a nickel oxide fine particle and a coating layer including a zirconium hydroxide, which is formed on the surface of the core particle as its main component, and that the zirconium content contained in the coating layer is 0.001 to 0.01 g/m$^2$ per surface area of the nickel oxide fine particle, the good specific resistances are obtained and particularly the oxidation expansion coefficients are 1.1 to 14% which are satisfactory. In contrast, it can be understood that because the conditions of the coating layer are not satisfied in Comparative Examples 1 to 3, satisfactory results are not obtained for either the specific resistance or the oxidation expansion coefficient.

In addition, as apparent from Table 2, it can be understood that, in Example 4, the voltage drop rates after 3 (three) cycles and after 1 cycle of the oxidation-re-reduction cycle in till 0.5 A/cm$^2$ are lower than 5% and lower than 0.5% respectively, which are satisfactory. In contrast, it can be understood that because the coating layer is not formed in Comparative Example 3, satisfactory results are not obtained for the voltage drop rate.

As apparent from the above, the nickel oxide powder material and its production method of the present invention are suitable as a nickel oxide powder material for an anode material to be used in a solid oxide type fuel cell and its efficient production method. The anode material used the nickel oxide powder material, the anode used it and the solid oxide type fuel cell provided with the anode can decrease deterioration of the power generation characteristics even in the case that the anode is exposed to an oxidizing atmosphere caused by the disruption of the fuel supply at operating temperature or the like and thus gain an advantage over conventional products.

What is claimed is:

1. A method for producing a nickel oxide powder material comprising a core particle (a) composed of a nickel oxide particle and a coating layer (b) comprising a zirconium hydroxide, which is formed on the surface of the core particle (a), as its main component and that the zirconium content to be contained in the coating layer (b) is 0.001 to 0.01 g/m$^2$ per surface area of the nickel oxide particle, the method comprising: a step (A) to form the nickel oxide particle having a coating layer comprising a zirconium hydroxide as its main component by supplying an aqueous solution comprising a zirconium salt and urea into an aqueous suspension comprising a nickel oxide particle, and a step (B) for subjecting the nickel oxide particle formed in said step (A) to solid/liquid separation and drying treatment.

2. The method for producing a nickel oxide powder material according to claim 1, characterized in that said aqueous solution comprising a zirconium salt and urea comprises a sufficient amount of the zirconium salt to satisfy that the zirconium content contained in the coating layer (b) of the obtained nickel oxide powder material is 0.001 to 0.01 g/m$^2$ per surface area of the nickel oxide particle to be used for the core particle (a).

3. The method for producing a nickel oxide powder material according to claim 1 characterized in that said zirconium salt is zirconium sulfate or zirconyl nitrate.

4. The method for producing a nickel oxide powder material according to claim 1 characterized in that sodium hexametaphosphate is added into said aqueous suspension.

5. The method for producing the nickel oxide powder material according to claim 1, wherein the layer thickness of said coating layer (b) is 0.5 to 5 nm.

6. A method for producing a nickel oxide powder material comprising a core particle (a) composed of a nickel oxide particle and a coating layer (b) comprising a zirconium oxide, which is formed on the surface of the core particle (a), as its main component and that the zirconium content to be contained in the coating layer (b) is 0.001 to 0.01 g/m² per surface area of the nickel oxide particle, the method comprising a step (A) to form the nickel oxide particle having a coating layer comprising: a zirconium hydroxide as its main component by supplying an aqueous solution comprising a zirconium salt and urea into an aqueous suspension comprising a nickel oxide particle, a step (B) for subjecting the nickel oxide particle formed in said step (A) to solid/liquid separation and drying treatment, and a step (C) for subjecting the nickel oxide particle after drying treatment obtained in said step (B) to heating treatment and subjecting the zirconium hydroxide to thermal decomposition.

7. The method for producing a nickel oxide powder material according to claim 6, characterized in that said aqueous solution comprising a zirconium salt and urea comprises a sufficient amount of the zirconium salt to satisfy that the zirconium content contained in the coating layer (b) of the obtained nickel oxide powder material is 0.001 to 0.01 g/m² per surface area of the nickel oxide particle to be used for the core particle (a).

\* \* \* \* \*